US007571046B2

(12) United States Patent
Weng

(10) Patent No.: US 7,571,046 B2
(45) Date of Patent: Aug. 4, 2009

(54) ENGINE OPTIMISATION METHOD AND APPARATUS

(75) Inventor: Larry Lin Feng Weng, Sunnybank Hills (AU)

(73) Assignee: The University of Queensland, Brisbane (AU)

( * ) Notice: Subject to any disclaimer, the term of this patent is extended or adjusted under 35 U.S.C. 154(b) by 14 days.

(21) Appl. No.: 11/568,424

(22) PCT Filed: Apr. 27, 2005

(86) PCT No.: PCT/AU2005/000592

§ 371 (c)(1),
(2), (4) Date: Jun. 8, 2007

(87) PCT Pub. No.: WO2005/103472

PCT Pub. Date: Nov. 3, 2005

(65) Prior Publication Data

US 2007/0282509 A1    Dec. 6, 2007

(30) Foreign Application Priority Data

Apr. 27, 2004    (AU) .............................. 2004201718

(51) Int. Cl.
G06F 19/00    (2006.01)
F02D 41/00    (2006.01)
(52) U.S. Cl. ...................... 701/101; 123/674
(58) Field of Classification Search ................. 701/101, 701/114, 115; 123/674, 435
See application file for complete search history.

(56) References Cited

U.S. PATENT DOCUMENTS

| 5,421,302 | A | 6/1995 | Livshits |
| 5,577,474 | A | 11/1996 | Livshits |
| 5,749,346 | A | 5/1998 | Halvorson |
| 6,061,623 | A * | 5/2000 | Hippley et al. ............... 701/93 |
| 6,253,140 | B1 * | 6/2001 | Jain et al. ..................... 701/67 |
| 6,253,546 | B1 | 7/2001 | Sun |
| 6,318,349 | B1 | 11/2001 | Muto |
| 6,449,548 | B1 * | 9/2002 | Jain et al. ..................... 701/56 |
| 6,601,442 | B1 * | 8/2003 | Decker et al. ............. 73/114.15 |
| 7,111,611 | B1 | 9/2006 | Lyon |

FOREIGN PATENT DOCUMENTS

| DE | 40 19 574 A1 | 2/1991 |
| DE | 19906416 | 8/2000 |
| DE | 100 06 264 C1 | 8/2001 |
| JP | 60 013943 A | 1/1985 |

* cited by examiner

Primary Examiner—John T Kwon
(74) Attorney, Agent, or Firm—Boyle Fredrickson, S.C.

(57) ABSTRACT

An engine management apparatus for an internal combustion engine of a vehicle includes a microprocessor that is operable on adjustment mechanisms of the vehicle. The vehicle has a torque sensor for sensing torque generated by the engine and the adjustment mechanisms adjust parametric values related to the torque. Memory circuitry is accessible by the microprocessor. The memory circuitry stores data representing at least one set of parametric values and a range of torque values corresponding to respective parametric values in the set. A set of instructions are executable by the microprocessor so that the microprocessor cyclically retrieves a real time torque value from the torque sensor and updates the memory if the retrieved torque value is higher than a stored torque value corresponding to a current parametric value. The microprocessor adjusts the current parametric value if the retrieved torque value is lower than the stored torque value.

15 Claims, 4 Drawing Sheets

ENGINE OPTIMISATION METHOD AND APPARATUS

FIELD OF THE INVENTION

The present invention relates to engine management systems and in particular to systems for managing spark timing and fuel injection.

BACKGROUND TO THE INVENTION

The main task of an ignition system is to provide a precisely timed spark with sufficient current to ignite an air fuel mixture within the engine's combustion chambers. The timing of the spark must be varied depending on a number of different operating conditions. In the past it has been a general principle that spark advance should be increased with higher engine speeds in order to optimise performance and fuel economy and decreased under heavy load conditions to avoid detonation.

A number of approaches have been taken to adjusting ignition timing in internal combustion engines. From the 1920's to the 1970's engines were equipped with point-type ignition systems. These generally made use of vacuum and centrifugal spark advance systems to advance the spark timing over a range of crankshaft RPM's. The degree of advance was a predetermined function of the physical parameters of the vacuum and centrifugal assemblies.

During the late 1970's and early 1980's, electronic ignition systems were introduced with computer-controlled spark timing. Such systems incorporate an electronic ignition module including a processor that communicates with a ROM. The ROM stores a look-up table, or "map" of predetermined spark timing values. The spark timing values are determined in the factory for each of a number of different engine operating conditions defined by variables such as throttle position, engine temperature, air temperature, cam speed and crank speed.

In use, a vehicle fitted with the electronic ignition module is also fitted with a number of sensors that monitor each of the above variables. The electronic ignition module retrieves spark timing values from the look-up table on the basis of signals from the sensors.

There are a number of problems associated with an electronic ignition system of the type described above. One of the problems is that engines rarely operate under steady state conditions when they are being driven. However, the spark timing look-up table is determined in the factory under steady-state conditions. For example, under dynamic conditions, airflow into the engine will usually be highly turbulent and unpredictable. Consequently the spark advance value that is retrieved from a factory-calibrated look-up table for a particular engine operating condition may not be optimal for an engine that is installed in a vehicle that is being driven.

A further difficulty is that the timing values stored in spark timing maps are usually somewhat conservative. This is because car-manufacturers are careful to avoid pinging and the associated risk of engine damage. Accordingly, the timing values stored in pre-calibrated maps are backed off to avoid pinging. Backing off the timing values avoids pinging but it also arrives at timing values which reduce peak engine torque output.

It is an object of the present invention to provide an engine management system that addresses the above problems.

SUMMARY OF THE INVENTION

In this specification, the comparative terms "higher", "lower" and "same" are used. It is to be understood that these terms are used to compare values within a predetermined range. Thus, if a first value is stated to be the "same" as a second value, provided the first value is within a predetermined degree of accuracy the second value then the first value will be understood to be the same as the second value. This predetermined degree of accuracy or tolerance depends on the application of the invention and will readily be applied by a person skilled in the art. Thus, "lower" means a value less than a lower limit of said tolerance, while "higher" mean a value higher than an upper limit of said tolerance.

According to a first aspect of the invention, there is provided an engine management apparatus for an internal combustion engine of a vehicle having a torque sensor for sensing torque generated by the engine and adjustment mechanisms for adjusting parametric values related to the torque, the engine management apparatus including a microprocessor that is operable on the adjustment mechanisms; and memory circuitry that is accessible by the microprocessor, the memory circuitry storing data representing at least one set of parametric values and a range of torque values corresponding to respective parametric values in the, or each, set and a set of instructions for execution by the microprocessor so that the microprocessor cyclically retrieves a real time torque value from the torque sensor and updates the memory if the retrieved torque value is higher than a stored torque value corresponding to a current parametric value or adjusts the current parametric value if the retrieved torque value is lower than the stored torque value.

The memory circuitry may store data representing a torque buffer. The set of instructions may be executable by the microprocessor such that the microprocessor writes torque values received from the torque sensor to the torque buffer at predetermined intervals. The memory circuitry may store data representing a torque map in which said range of torque values are stored.

The microprocessor may be operable to adjust an ignition setting of the vehicle. The memory circuitry may further store data representing an ignition map, the torque map and the ignition map containing, respectively, corresponding torque values and ignition timing values.

The microprocessor may be operable to adjust a fuel injection setting of the vehicle. The memory circuitry may further store data representing a fuel injection map containing fuel injection settings corresponding with respective values in the torque map.

The instructions may be executable by the microprocessor such that the microprocessor is configured to perform the following actions:

retrieving a most recent torque value from the torque buffer; and advancing ignition timing if the most recent torque value is lower than a torque value in the torque map for a pre-increased ignition timing; or updating the torque map if a most recent torque value is higher than the torque value in the torque map for the pre-increased ignition timing.

The instructions may be executable by the microprocessor such that the microprocessor is configured to perform the following actions:
- again advancing ignition timing if a most recent torque value is higher than a pre-advanced torque value; or
- retarding ignition timing if a most recent torque value is lower than the pre-advanced torque value; and
- again retarding ignition timing if a subsequent most recent torque value is higher than a pre-retarded torque value; or
- again advancing ignition timing if a most recent torque value is lower than the pre-retarded torque value.

The instructions may be executable by the microprocessor such that the microprocessor is configured to perform the following actions:
- updating the torque map if a most recent torque value is within a predetermined tolerance of the pre-advanced torque value; or
- updating the torque map if a most recent torque value is within a predetermined tolerance of the pre-retarded torque value.

The instructions may be executable by the microprocessor such that the microprocessor is configured to perform the following actions:
- increasing a fuel injection setting if a most recent torque value is within a predetermined tolerance of the pre-advanced torque value; and
- again increasing the fuel injection setting if a most recent torque value is higher than a pre-increased torque value; or
- decreasing the fuel injection setting if a most recent torque value is lower than the pre-increased torque value; and
- again decreasing the fuel injection setting if a most recent torque value is higher than a pre-decreased torque value; or
- again increasing the fuel injection setting if a most recent torque value is lower than the pre-decreased torque value.

The instructions may be executable by the microprocessor such that the microprocessor is configured to perform the following actions:
- increasing a fuel injection setting if a most recent torque value is within a predetermined tolerance of the pre-retarded torque value; and
- again increasing the fuel injection setting if a most recent torque value is higher than a pre-increased torque value; or
- decreasing the fuel injection setting if a most recent torque value is lower than the pre-increased torque value; and
- again decreasing the fuel injection setting if a most recent torque value is higher than a pre-decreased torque value; or
- again increasing the fuel injection setting if a most recent torque value is lower than the pre-decreased torque value.

The instructions may be executable by the microprocessor such that the microprocessor is configured to perform the following actions:
- updating the torque map if a most recent torque value is within a predetermined tolerance of the pre-increased torque value; or
- updating the torque map if a most recent torque value is within a predetermined tolerance of the pre-decreased torque value.

The instructions may be executable by the microprocessor such that the microprocessor is configured to perform the following actions:
- retrieving a most recent torque value from the torque buffer;
- again retrieving the most recent torque value from the torque buffer if the most recent torque value is greater than a torque value in the torque map for a present ignition setting; or
- retarding ignition timing if the most recent torque value is less than the torque value for that ignition setting; and
- calculating a torque gradient by applying a derivative algorithm to a most recent torque value and an ignition setting; and
- advancing ignition timing if the torque gradient is positive; or
- retarding ignition timing if the torque gradient is negative; or
- updating the torque map if the most recent torque value is within a predetermined tolerance of the pre-retarded torque value.

The instructions may be executable by the microprocessor such that the microprocessor is configured to perform the following actions:
- increasing a fuel injection setting if the most recent torque value is within a predetermined tolerance of the pre-retarded torque value; and
- calculating a torque gradient by applying a derivative algorithm to a most recent torque value and a fuel injection setting; and
- increasing the fuel injection setting if the torque gradient is positive; or
- decreasing the fuel injection setting if the torque gradient is negative; or
- updating the torque map if the most recent torque value is within a predetermined tolerance of the pre-increased torque value.

According to a second aspect of the invention, there is provided a method of managing an internal combustion engine of a vehicle having a torque sensor for sensing a torque generated by the engine, adjustment mechanisms for adjusting parametric values related to the torque, a microprocessor that is operable on the adjustment mechanisms and memory circuitry that is accessible by the microprocessor, the memory circuitry storing data representing at least one set of parametric values corresponding to a range of torque values to define a torque map, the method including the steps of:

(a) retrieving a torque value from the torque sensor;
(b) updating the torque map if the retrieved torque value is higher than a stored torque value corresponding with a current parametric value or adjusting the current parametric value if the retrieved torque value is lower than the stored torque value; and
(c) repeating steps (a) and (b).

The method may include the step of writing torque values received from the torque sensor to a torque value buffer at predetermined intervals.

The method may include the steps of:
- retrieving a most recent torque value from the torque value buffer; and
- advancing ignition timing if the most recent torque value is lower than a stored torque value corresponding to that ignition timing in the torque map; or
- updating the torque map if the most recent torque value is higher than a stored torque value corresponding to that ignition timing in the torque map and subsequently retrieving a most recent torque value from the torque value buffer.

The method may include the steps of:
again advancing ignition timing if the most recent torque value is higher than the pre-advanced torque value; or
retarding ignition timing if the most recent torque value is lower than the pre-advanced torque value; and
again retarding ignition timing if the most recent torque value is higher than the pre-retarded torque value; or
again advancing the ignition timing if the most recent torque value is lower than the pre-retarded torque value.

The method may include the steps of:
updating the torque map if the most recent torque value is within a predetermined tolerance of the pre-advanced torque value; or
updating the torque map if the most recent torque value is within a predetermined tolerance of the pre-retarded torque value.

The method may include the steps of:
increasing a fuel injection setting if a most recent torque value is within a predetermined tolerance of the pre-retarded torque value;
again increasing the fuel injection setting if a most recent torque value is higher than a pre-increased torque value; or
decreasing the fuel injection setting if a most recent torque value is lower than the pre-increased torque value; and
again decreasing the fuel injection setting if a most recent torque value is higher than a pre-decreased torque value; or
again increasing the fuel injection setting if a most recent torque value is lower than the pre-decreased torque value.

The method may include the steps of:
updating the torque map if the most recent torque value is within a predetermined tolerance of the pre-advanced torque value; or
updating the torque map if the most recent torque value is within a predetermined tolerance of the pre-retarded torque value.

The method may include the steps of:
retrieving a most recent torque value from the torque buffer;
again retrieving the most recent torque value if the most recent torque value is greater than a torque value in the torque map for a present ignition setting; or
retarding ignition timing if the most recent torque value is less than the torque value for that ignition setting; and
calculating a torque gradient by applying a derivative algorithm to a most recent torque value and an ignition setting; and
advancing ignition timing if the torque gradient is positive; or
retarding ignition timing if the torque gradient is negative; or
updating the torque map if the most recent torque value is within a predetermined tolerance of the pre-retarded torque value.

The method may include the steps of:
increasing a fuel injection setting if the most recent torque value is within a predetermined tolerance of the pre-retarded torque value; and
again increasing the fuel injection setting if the most recent torque value is higher than a pre-increased torque value; and
calculating a torque gradient by applying a derivative algorithm to a most recent torque value and a fuel injection setting; and
increasing the fuel injection setting if the torque gradient is positive; or
decreasing the fuel injection setting if the torque gradient is negative; or
updating the torque map if the most recent torque value is within a predetermined tolerance of the pre-increased torque value.

According to a third aspect of the invention, there is provided an internal combustion engine which includes an engine management apparatus as described above.

According to a fourth aspect of the invention there is provided a vehicle which includes the internal combustion engine.

The invention is described below, by way of example with reference to the drawings. The following description is intended to facilitate the implementation of the invention and is thus directed to a person skilled in the art. It is to be noted that the following description is not intended to limit the scope of the invention as claimed or as described in the preceding summary in any way whatsoever.

DETAILED DESCRIPTION OF EXEMPLARY EMBODIMENTS

Figure 1:
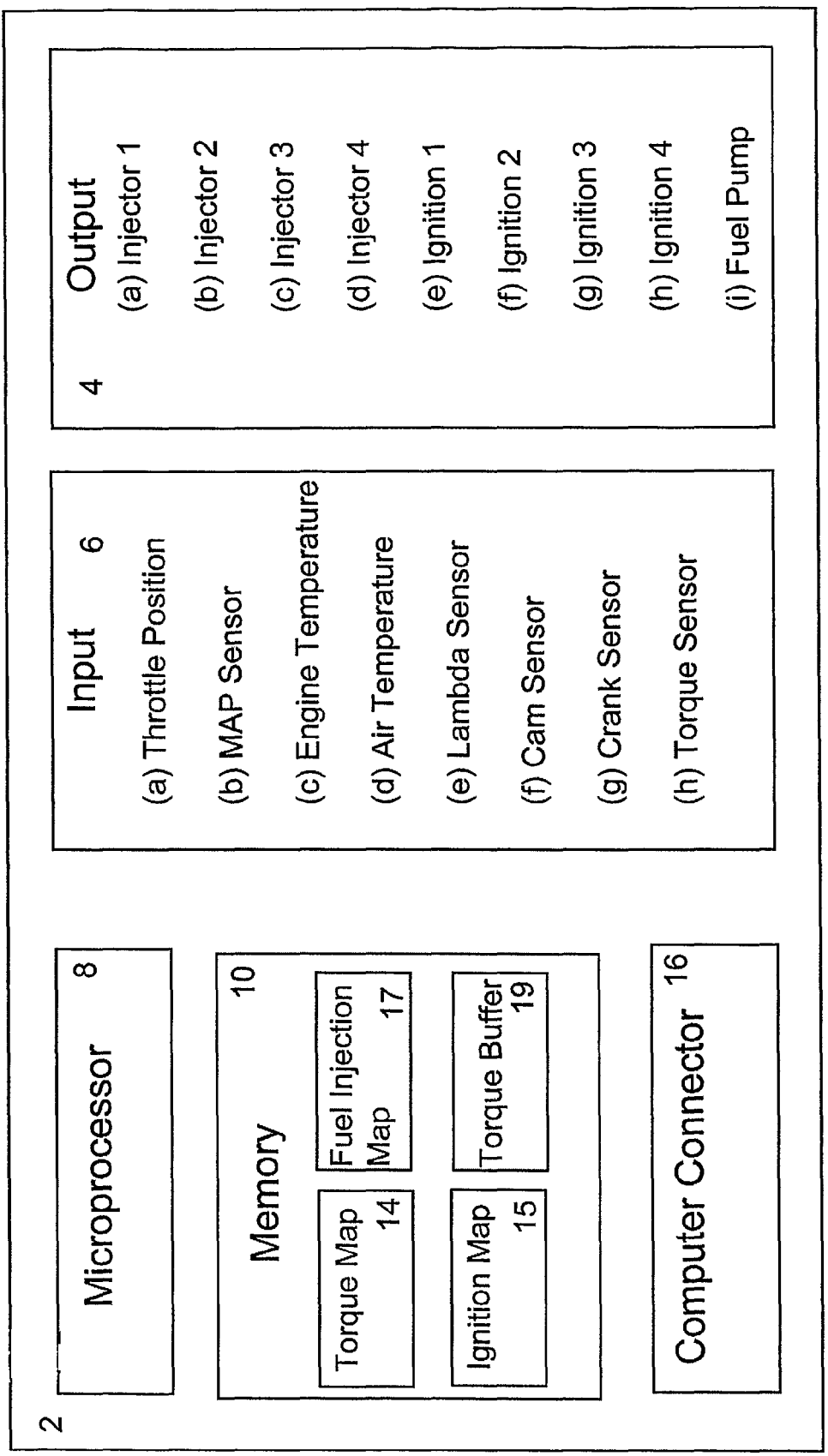
FIG. 1 is a functional block diagram of an engine management apparatus according to a preferred embodiment of the present invention.

In FIG. 1, reference numeral 2 generally indicates a block diagram of an engine management apparatus according to a preferred embodiment of the present invention. The invention is described below with reference to a version of the invention suitable for managing a four-cylinder engine. However it will be realised that it may be readily adapted to suit engines of more or less cylinders.

The apparatus 2 includes a microprocessor 8 which accesses memory circuitry defining a memory 10 that stores a software product containing various instructions for execution by the microprocessor 8 as explained below with reference to the flowcharts of FIGS. 2 and 3. The memory 10 is divided into a number of segments that provide a torque map 14, an ignition map 15, a fuel injection map 17 and a torque buffer 19.

The microprocessor 8 processes data from an input port 6 which includes suitable ADCs for converting analogue sensor outputs to digital signals suitable for processing by the microprocessor 8. In use, the input port 6 is connected to a number of sensors which monitor various operational parameters of the vehicle in which the apparatus 2 is operatively mounted. The various sensors include:

(a) a throttle position sensor usually used to indicate engine load on non-turbo engines.
(b) a manifold air pressure sensor usually used to indicate engine load on turbo engines.
(c) an engine temperature sensor to measure engine coolant temperature.
(d) an air temperature sensor to measure the engine inlet air temperature which can affect the air-fuel ratio.

(e) a lambda sensor to monitor the engine's exhaust gases in order to measure the air-to-fuel ratio of the combustible mixture injected into the engine.

(f) a cam sensor to determine the occurrence of top dead centre of a first cylinder.

(g) a crank sensor to determine the crank shaft position in degrees relative to piston top dead centre.

(h) a torque sensor to determine the torque being generated by the engine.

The sensors (a) to (g) are implemented by means which are well known in the art of automated engine management control and so will not be discussed further in detail. In contrast, with respect to the sensor (h), it has not hitherto been commonplace to monitor engine torque during standard on-road use of a vehicle. In use, the torque sensor (h) is coupled to a magnetostrictive torque sensor that is mounted to the engine's crankshaft. Suitable torque sensors may be obtained from ABB Automation Products AB of S-721 59 Västerås Sweden. A moving average from the output of the torque sensor (h) is written to the torque buffer 19 so that, in use, the buffer 19 contains a value which is updated every few revolutions of the engine's crankshaft.

The microprocessor 8 processes the data received through the input port 6 in accordance with the instructions of a program in the memory 10 and generates a number of control signals which are delivered to an output port 4. In use, a number of adjustment mechanisms in the form of actuators are coupled to the output port 4. These actuators include:

(a) to (d) Pulse width modulated control signals for the injectors of each of the four cylinders.

(e) to (h) Ignition coil control signals for the ignition coils corresponding to the spark plugs of each of the four cylinders.

(i) Pulse width modulated control signal to control the engine's fuel pump.

Figure 2:
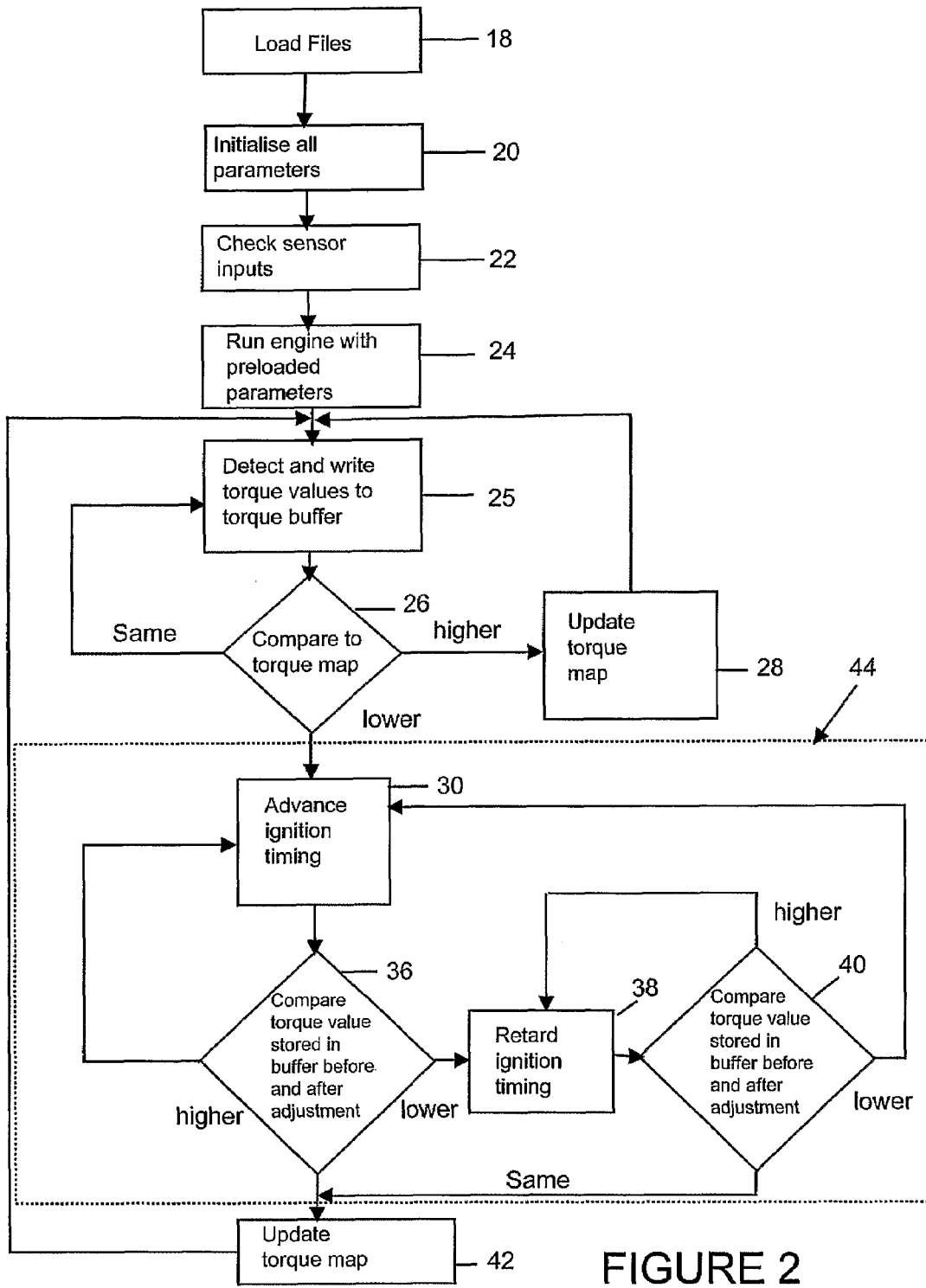
FIG. 2 is a flowchart of a first embodiment of a method for operating the engine management apparatus of FIG. 1.

Referring now to FIG. 2, there is depicted a flowchart of the instructions stored in the memory 10. When the apparatus 2 is powered up, the microprocessor 8 accesses the memory 10 and loads a series of initialisation instructions represented by boxes 18, 20, 22, 24. Initially, at the box 18, the microprocessor 8 retrieves data concerning the operational characteristics of the vehicle's engine and of the actuators and the sensors described above. At the box 20, program variables are set according to the parameters retrieved at the box 18. At the box 22, the microprocessor checks that the sensors and actuators are operational. At the box 24, the engine is run with the actuators controlled in accordance with the parameters retrieved at the box 18.

At the box 25, the torque values generated by the torque sensor are written to the torque buffer 19, from the input port 6. The torque buffer 19 can be a FIFO buffer so that the buffer 19 is continuously updated, at predetermined intervals, with most recent torque values.

At a box 26, the microprocessor 8 compares a most recent torque value in the torque buffer 19 with a value stored in the torque map 14 that corresponds to the most recent load and speed characteristics of the engine. The engine's most recent load and speed are calculated from the other sensor inputs according to procedures known in the prior art.

If the torque value retrieved from the torque buffer 19 is higher than the value retrieved from the torque map 14, then control diverts to the box 28 and the processor 8 updates the torque map 14 with the new torque value for the particular speed and load parameters.

If the torque value retrieved from the buffer 19 and the value retrieved from the torque map 14 are the same, then it means the current setting is still optimum. Consequently, no change is made to the ignition timing parameters and control diverts back to box 25.

If the torque value retrieved from the torque buffer 19 is lower than the value retrieved from the torque map 14 control diverts to a tuning process, indicated at 44. In particular, control diverts to a box 30 and the microprocessor 8 acts to advance the engine's ignition timing by altering the relevant values in the ignition map 15 so that appropriate control signals are sent via the output port 4 to effect the new ignition timing.

At the box 36, the microprocessor 8 retrieves the most recent torque value from the torque buffer 19 resulting from the new ignition timing and compares it to the previous torque value before the adjustment of ignition timing stored in the buffer 19. If the most recent torque value is higher than the previous torque value then control reverts back to box 30 where the ignition is again advanced.

If the most recent torque value is lower than the previous torque value then control diverts to a box 38 and the ignition timing is retarded by making an adjustment to the ignition map 15. The microprocessor 8 retrieves the value and sends appropriate control signals via the output port 4. Then at a box 40 the most recent torque value in the torque buffer 19 is compared to the previous torque value before the adjustment stored in the buffer 19. If the most recent torque value is higher than the previous value stored in the buffer 19, then control diverts back to box 38 where the ignition is retarded. If the most recent torque value is lower than the previous value stored in the buffer 19, control diverts to the box 30 where the ignition timing is advanced. If the most recent torque value is the same as the previous value stored in the buffer 19, then control is passed out of the process 44 to a box 42. At the box 42 the microprocessor 8 updates the torque map 14.

It will be realised that the tuning process 44 serves to determine iteratively optimal ignition timing under the engine's current operational load and speed. In other words, the tuning process 44 serves to tune the engine while the engine is running.

Returning to the box 36, in the event that the microprocessor 8 determines that the most recent torque value is the same as the previous torque value stored in the buffer 19 before the adjustment then control is passed out of the process 44 to the box 42. At the box 42 the microprocessor 8 updates the torque map 14.

Finally, control is passed to a point upstream of the box 25 where the microprocessor 8 continues to receive torque values from the torque sensor and to write said torque values to the torque buffer 19.

Figure 3:
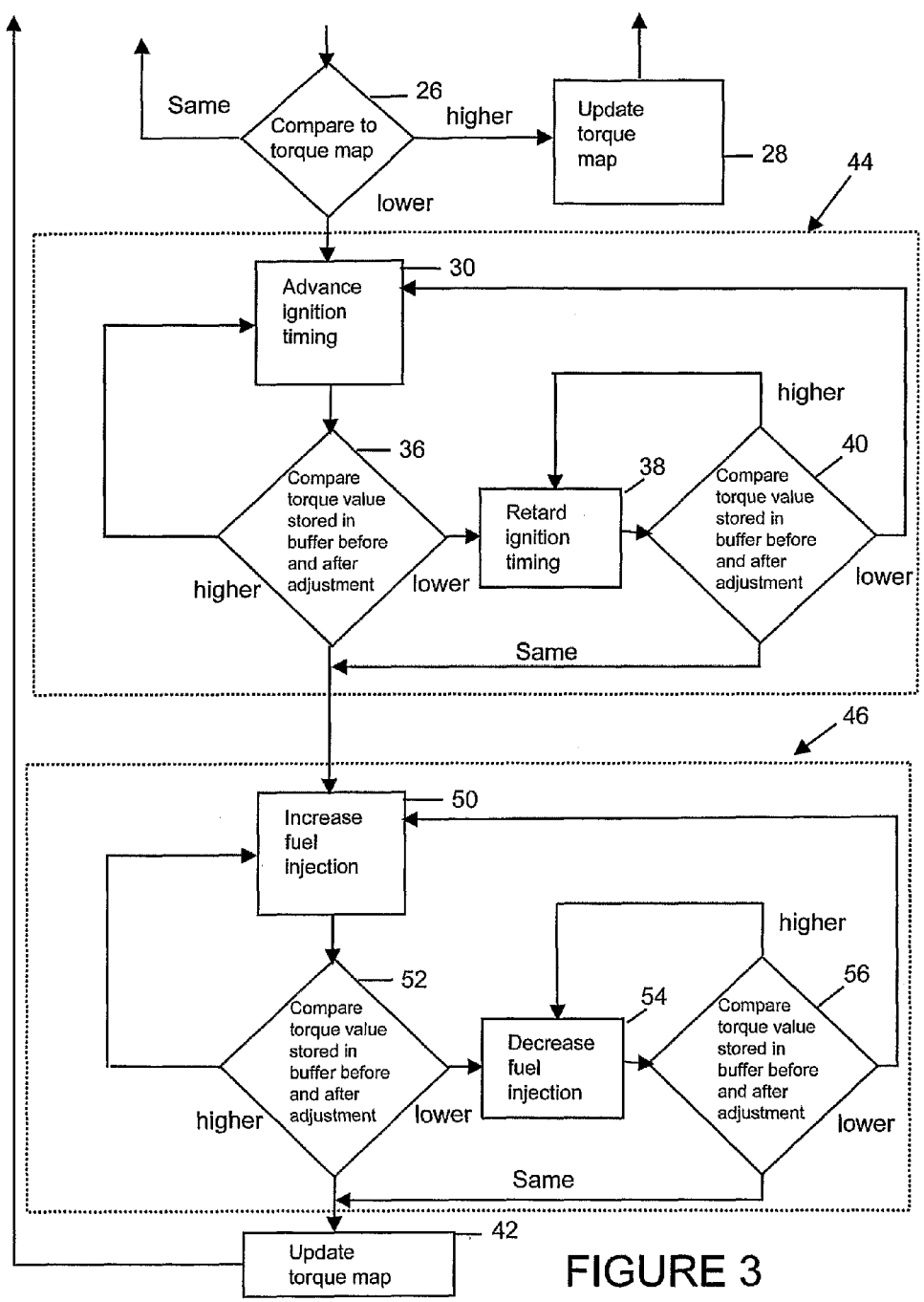
FIG. 3 is a flowchart of an extension of the method of FIG. 2 to a fuel injection-based engine.

In FIG. 3, there is depicted a flowchart of another embodiment of the instructions stored in memory 10. With reference to FIG. 2, like reference numerals refer to like parts, unless otherwise specified.

In FIG. 3, a further tuning process 46, indicated in dotted lines, shows tuning steps associated with an engine that incorporates a fuel injection system. In particular, the process 46 is an injection tuning process that can be used in addition to, or separately from, the ignition tuning process 44 described above.

In this embodiment, in the event that the microprocessor 8 determines that the most recent torque value is the same as the previous torque value stored in the buffer 19 before adjustment, then control is passed to a box 50 of the process 46. At the box 50, the microprocessor 8 acts to increase the fuel injection, by altering the relevant values in the fuel injection map 17.

At a decision box 52, the microprocessor 8 retrieves the most recent torque value from the torque buffer 19 resulting from the new fuel injection setting and compares it to the previous torque value stored in the buffer 19 before the adjustment of the fuel injection.

If the most recent torque value is lower than the previous torque value then control diverts to a box 54 and the fuel injection setting is decreased by making an adjustment to the fuel injection map 17. The microprocessor 8 retrieves the value from the fuel injection map 17 and sends appropriate control signals via the output port 4. Then at a decision box 56 the most recent torque value in the torque buffer 19 is compared to the previous torque value stored in the buffer 19 before the adjustment. If the most recent torque value is higher than the previous value stored in the buffer 19 then control diverts back to the box 54 at which point the microprocessor 8 decreases the fuel injection. If the most recent torque value is lower than the previous value stored in the buffer 19, then control diverts to the box 50 where the microprocessor 8 serves to increase the fuel injection. If the most recent torque value is the same as the previous value stored in the buffer 19, then control is passed out of the box 46 to the box 42, where the microprocessor 8 updates the torque map 14.

Returning to the box 52, in the event that the microprocessor 8 determines that the most recent torque value is higher than the previous torque value stored in the buffer 19 before the adjustment then control diverts back to the box 50 to increase the fuel injection.

Returning again to the box 52, in the event that the microprocessor 8 determines that the most recent torque value is the same as the previous torque value stored in the buffer 19 before the adjustment then control is passed on to the box 42, where the microprocessor 8 updates the torque map 14.

Finally, control is passed to a point upstream of the box 25 where the microprocessor 8 continues to receive torque values from the torque sensor and to write said torque values to the torque buffer 19.

It will be realized that the process 46 serves to determine iteratively optimal fuel injection under the engine's current operational load and speed. In other words, the process 46 serves to tune the fuel injection setting while the engine is running.

Figure 4:
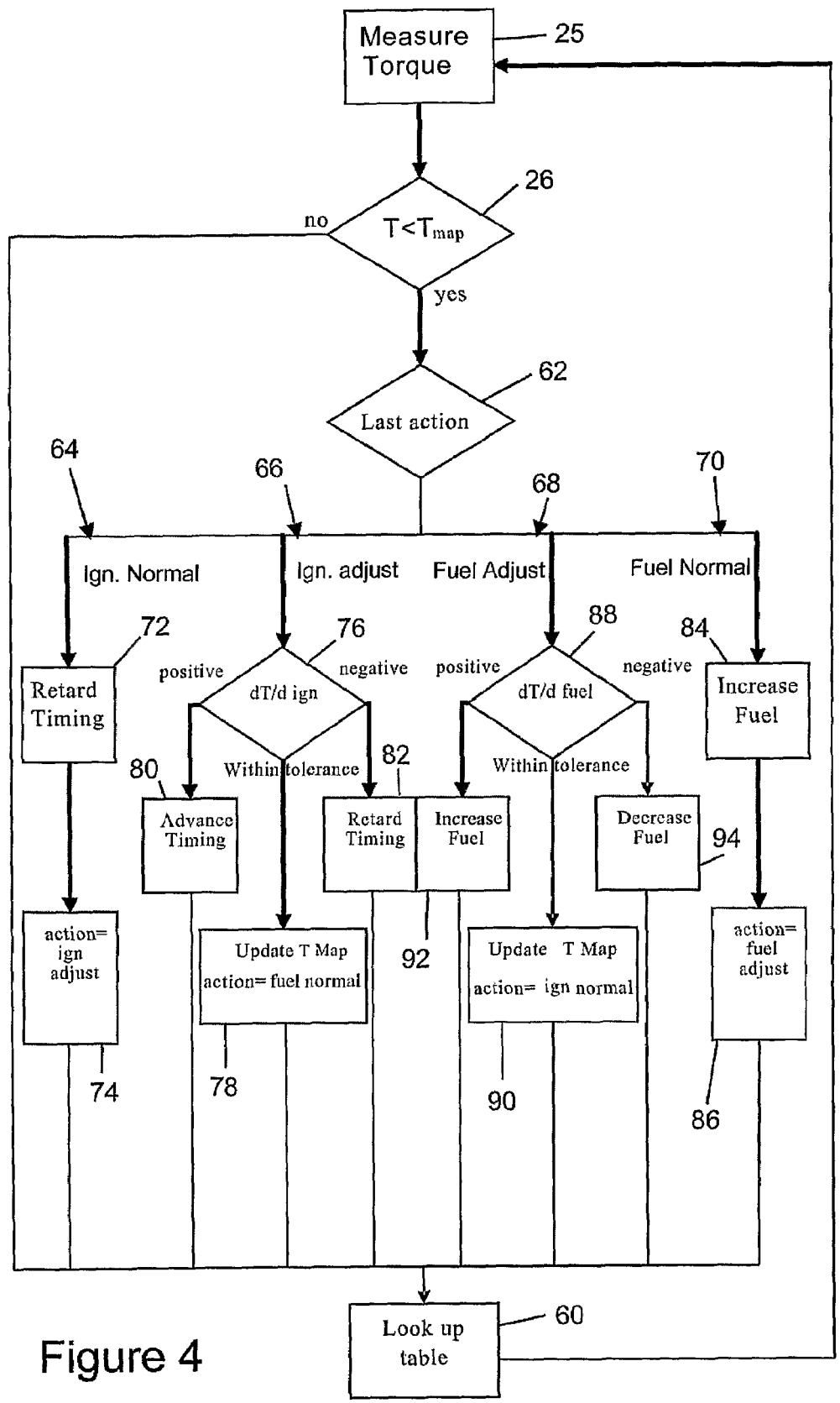
FIG. 4 is a flowchart of a second embodiment of a method for operating the engine management apparatus of FIG. 1

In FIG. 4, there is depicted a flowchart of another embodiment of the instructions stored in the memory 10. With reference to FIGS. 1 to 3, like reference numerals refer to like parts, unless otherwise specified.

As before, the torque values are detected and written to the torque buffer 19 at the box 25. Also, at the subsequent box 26, the detected torque values are compared to the torque values stored in the torque map 14. If the detected torque value is higher than the corresponding torque value stored in the torque map 14, control passes back to the box 25, via a box 60 at which flags are written to a look up table.

If the detected torque value is lower than the corresponding torque value stored in the torque map 14 then control is passed to a box 62 where control is passed either to a normal ignition process 64, an ignition adjustment process 66, a fuel injection adjustment process 68 or a normal fuel injection process 70. The instructions stored in the memory 10 are such that control defaults to the process 64 if no flag is detected at the box 62.

During the normal ignition process 64, ignition timing is retarded at a box 72 by the microprocessor 8. Then the process 64 generates a flag at a box 74 to adjust ignition timing. Control subsequently passes to the box 62 where the flag is written to the look up table. Then control passes back to the box 25 where the torque is again measured and then to box 26.

At box 62, the flag generated by the process 64 is detected and control is passed to the process 66. During the process 64, the torque gradient is calculated at box 76 using a derivative algorithm based on the change in torque value with respect to a change in the ignition setting. It will be appreciated that this obviates the need for repetitive decision processes, as described in the above embodiments. If the torque value after adjustment is within a particular tolerance of the torque value before adjustment, then the torque map 14 is updated at the box 78. A flag that control is to pass to the process 70 is also generated at the box 78. The flag is written to the look up table at the box 60 prior to control passing to the box 25.

If the torque gradient is positive, then control passes to a box 80 where the microprocessor 8 advances the ignition timing. Control then passes to the box 25.

If the torque gradient is negative, then control passes to a box 82 where the microprocessor 8 retards the ignition timing. Control then passes to the box 25.

At the box 62, the flag generated by the process 66 is detected and control is passed to the process 70. During the process 70, the microprocessor 8 increases the fuel injection setting at 84. Control then passes to a box 86 where the process generates a flag that control is to pass to the process 68. The flag is written to the look up table at the box 60 prior to control passing to the box 25.

At box 62, the flag generated by the process 70 is detected and control is passed to the process 68. During the process 68, the torque gradient is calculated at box 88 using a derivative algorithm based on the change in torque value with respect to a change in the fuel injection setting. Again, it will be appreciated that this obviates the need for repetitive decision processes, as described in the above embodiments. If the detected torque value after adjustment is within a particular tolerance of the torque value before adjustment, then the torque map 14 is updated at a box 90. A flag that control is to pass to the process 64 is also generated at the box 90. The flag is written to the look up table at the box 60 prior to control passing to the box 25.

If the torque gradient is positive, control passes to a box 92 where the microprocessor 8 increases the fuel injection setting. Control then passes to the box 25, as before.

If the torque gradient is negative, control passes to a box 94 where the microprocessor 8 decreases the fuel injection setting. Control then passes to the box 25, as before.

This embodiment has been selected since it is inherently safe. The safety is achieved by an initial default to the process 64 where the ignition is retarded as a starting point. Furthermore, it will be appreciated that provided certain conditions are present, the process continuously cycles back to the process 64. Still further, the use of derivative algorithms provides a means whereby processor-intensive decision calculations are reduced.

It will be appreciated that the apparatus 2 provides a means whereby an internal combustion engine can be continuously tuned during operation for maximum torque for a number of parameters. It follows that the apparatus 2 can be used to ensure that the internal combustion engine operates at maximum efficiency.

It will readily be appreciated that the apparatus 2 and associated method can readily be applied with other parameters in addition to ignition timing and fuel injection settings.

The embodiments of the invention described herein are provided for purposes of explaining the principles thereof, and are not to be considered as limiting or restricting the invention since many modifications may be made by the exercise of skill in the art without departing from the scope of the invention.

The invention claimed is:

1. An engine management apparatus for an internal combustion engine of a vehicle having a torque sensor for sensing torque generated by the engine and adjustment mechanisms for adjusting parametric values related to the torque, the engine management apparatus comprising:

a microprocessor that is operable on the adjustment mechanisms and operable to adjust an ignition setting of the vehicle and to adjust a fuel injection setting of the vehicle;

memory circuitry that is accessible by the microprocessor, the memory circuitry storing data representing at least one set of parametric values and a range of torque values corresponding to respective parametric values in a set of instructions for execution by the microprocessor so that the microprocessor cyclically retrieves a real time torque value from the torque sensor and updates the memory if the retrieved torque value is higher than a stored torque value corresponding to a current parametric value or adjusts the current parametric value if the retrieved torque value is lower than the stored torque value;

wherein the memory circuitry stores data representing a torque buffer, the set of instructions being executable by the microprocessor such that the microprocessor writes torque values received from the torque sensor to the torque buffer at predetermined intervals, and a torque map in which said range of torque values are stored;

wherein the memory circuitry further stores data representing an ignition map, the torque map and the ignition map containing, respectively, corresponding torque values and ignition timing values; and wherein the memory circuitry further stores data representing a fuel injection map containing fuel injection settings corresponding with respective values in the torque map.

2. An engine management apparatus as claimed in claim 1, in which the instructions are executable by the microprocessor such that the microprocessor is configured to perform the following actions:

retrieving a most recent torque value from the torque buffer; and advancing ignition timing if the most recent torque value is lower than a torque value in the torque map for a pre-increased ignition timing; or updating the torque map if a most recent torque value is higher than the torque value in the torque map for the pre-increased ignition timing.

3. An engine management apparatus as claimed in claim 2, in which the instructions are executable by the microprocessor such that the microprocessor is configured to perform the following actions:

again advancing ignition timing if a most recent torque value is higher than a pre-advanced torque value; or retarding ignition timing if a most recent torque value is lower than the pre-advanced torque value; and again retarding ignition timing if a subsequent most recent torque value is higher than a pre-retarded torque value; or again advancing ignition timing if a most recent torque value is lower than the pre-retarded torque value.

4. An engine management apparatus as claimed in claim 3, in which the instructions are executable by the microprocessor such that the microprocessor is configured to perform the following actions:

updating the torque map if a most recent torque value is within a predetermined tolerance of the pre-advanced torque value; or updating the torque map if a most recent torque value is within a predetermined tolerance of the pre-retarded torque value.

5. An engine management apparatus as claimed in claim 3, in which the instructions are executable by the microprocessor such that the microprocessor is configured to perform the following actions:

increasing a fuel injection setting if a most recent torque value is within a predetermined tolerance of one of a group including (a) the pre-advanced torque value and (b) the pre-retarded torque value; and one of a group including (a) again increasing the fuel injection setting if a most recent torque value is higher than a pre-increased torque value, and (b) decreasing the fuel injection setting if a most recent torque value is lower than the pre-increased torque value; and one of a group including (a) again decreasing the fuel injection setting if a most recent torque value is higher than a pre-decreased torque value, and (b) again increasing the fuel injection setting if a most recent torque value is lower than the pre-decreased torque value.

6. An engine management apparatus as claimed in claim 5, in which the instructions are executable by the microprocessor such that the microprocessor is configured to perform the following actions:

updating the torque map if a most recent torque value is within a predetermined tolerance of the pre-increased torque value; or updating the torque map if a most recent torque value is within a predetermined tolerance of the pre-decreased torque value.

7. An engine management apparatus as claimed in claim 1, in which the instructions are executable by the microprocessor such that the microprocessor is configured to perform the following actions:

retrieving a most recent torque value from the torque buffer;

again retrieving the most recent torque value from the torque buffer if the most recent torque value is greater than a torque value in the torque map for a present ignition setting; or retarding ignition timing if the most recent torque value is less than the torque value for that ignition setting; and calculating a torque gradient by applying a derivative algorithm to a change in torque value with respect to a change in the ignition setting; and at least one of a group including (a) advancing ignition timing if the torque gradient is positive, (b) retarding ignition timing if the torque gradient is negative, and (c) updating the torque map if the most recent torque value is within a predetermined tolerance of the pre-retarded torque value.

8. An engine management apparatus as claimed in claim 7, in which the instructions are executable by the microprocessor such that the microprocessor is configured to perform the following actions:

increasing a fuel injection setting if the most recent torque value is within a predetermined tolerance of the pre-retarded torque value; and calculating a torque gradient by applying a derivative algorithm to a change in torque value with respect to a change in the fuel injection setting; and at least one of a group including (a) increasing the fuel injection setting if the torque gradient is positive, (b) decreasing the fuel injection setting if the torque gradient is negative, and (c) updating the torque map if the most recent torque value is within a predetermined tolerance of the pre-increased torque value.

9. A method of managing an internal combustion engine of a vehicle having a torque sensor for sensing a torque generated by the engine, adjustment mechanisms for adjusting parametric values related to the torque, a microprocessor that is operable on the adjustment mechanisms and memory circuitry that is accessible by the microprocessor, the memory circuitry storing data representing at least one set of parametric values corresponding to a range of torque values to define a torque map, the method comprising the steps of:

(a) retrieving a torque value from the torque sensor and writing the torque value received from the torque sensor to a torque value buffer at a predetermined interval;

(b) updating the torque map if the retrieved torque value is higher than a stored torque value corresponding with a current parametric value or adjusting the current parametric value if the retrieved torque value is lower than the stored torque value;

(c) retrieving a most recent torque value from the torque value buffer and advancing ignition timing if the most recent torque value is lower than a stored torque value corresponding to that ignition timing in the torque map; and (d) updating the torque map if the most recent torque value is higher than a stored torque value corresponding to that ignition timing in the torque map and subsequently retrieving a most recent torque value from the torque value buffer.

10. A method as claimed in claim 9, which includes the steps of:
again advancing ignition timing if the most recent torque value is higher than the pre-advanced torque value; or
retarding ignition timing if the most recent torque value is lower than the pre-advanced torque value; and
again retarding ignition timing if the most recent torque value is higher than the pre-retarded torque value; or
again advancing the ignition timing if the most recent torque value is lower than the pre-retarded torque value.

11. A method as claimed in claim 10, which includes the steps of:
updating the torque map if the most recent torque value is within a predetermined tolerance of the pre-advanced torque value; or
updating the torque map if the most recent torque value is within a predetermined tolerance of the pre-retarded torque value.

12. A method as claimed in claim 10, which includes the steps of:
increasing a fuel injection setting if a most recent torque value is within a predetermined tolerance of the pre-retarded torque value;
again increasing the fuel injection setting if a most recent torque value is higher than a pre-increased torque value; or
decreasing the fuel injection setting if a most recent torque value is lower than the pre-increased torque value; and
again decreasing the fuel injection setting if a most recent torque value is higher than a pre-decreased torque value; or
again increasing the fuel injection setting if a most recent torque value is lower than the pre-decreased torque value.

13. A method as claimed in claim 12, which includes the steps of:
updating the torque map if the most recent torque value is within a predetermined tolerance of the pre-advanced torque value; or
updating the torque map if the most recent torque value is within a predetermined tolerance of the pre-retarded torque value.

14. A method as claimed in claim 9, which includes the steps of:
retrieving a most recent torque value from the torque buffer;
again retrieving the most recent torque value if the most recent torque value is greater than a torque value in the torque map for a present ignition setting; or
retarding ignition timing if the most recent torque value is less than the torque value for that ignition setting; and
calculating a torque gradient by applying a derivative algorithm to a change in torque value with respect to a change in the ignition setting; and
at least one of a group including (a) advancing ignition timing if the torque gradient is positive, (b) retarding ignition timing if the torque gradient is negative, and (c) updating the torque map if the most recent torque value is within a predetermined tolerance of the pre-retarded torque value.

15. A method as claimed in claim 14, which includes the steps of:
increasing a fuel injection setting if the most recent torque value is within a predetermined tolerance of the pre-retarded torque value; and
again increasing the fuel injection setting if the most recent torque value is higher than a pre-increased torque value; and
calculating a torque gradient by applying a derivative algorithm to a change in torque value with respect to a change in the fuel injection setting; and
at least one of a group including (a) increasing the fuel injection setting if the torque gradient is positive, (b) decreasing the fuel injection setting if the torque gradient is negative, and (c) updating the torque map if the most recent torque value is within a predetermined tolerance of the pre-increased torque value.

* * * * *